US010489812B2

(12) United States Patent
Chang et al.

(10) Patent No.: US 10,489,812 B2
(45) Date of Patent: Nov. 26, 2019

(54) ACQUIRING AND PUBLISHING SUPPLEMENTAL INFORMATION ON A NETWORK

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 14/799,818

(22) Filed: Jul. 15, 2015

(65) Prior Publication Data
US 2017/0017981 A1    Jan. 19, 2017

(51) Int. Cl.
*G06Q 30/02*    (2012.01)
*G06Q 50/00*    (2012.01)

(52) U.S. Cl.
CPC ..... *G06Q 30/0217* (2013.01); *G06Q 30/0203* (2013.01); *G06Q 50/01* (2013.01)

(58) Field of Classification Search
CPC .......... G06Q 30/0217; G06Q 30/0203; G06Q 50/01; G06Q 30/0201
See application file for complete search history.

(56) References Cited

U.S. PATENT DOCUMENTS

| | | | | |
|---|---|---|---|---|
| 8,737,678 B2 * | 5/2014 | Everingham | ........... | G06F 16/58 382/100 |
| 2012/0221418 A1 * | 8/2012 | Smith | .................... | G06Q 30/02 705/14.67 |
| 2013/0260727 A1 * | 10/2013 | Knudson | ................ | G06Q 30/00 455/414.1 |
| 2013/0282417 A1 * | 10/2013 | Gaedcke | ............. | G06Q 30/016 705/7.13 |
| 2013/0297454 A1 * | 11/2013 | Eronen | .................. | G06Q 30/02 705/26.61 |
| 2013/0325552 A1 * | 12/2013 | Niazi | ................. | G06Q 30/0203 705/7.32 |
| 2014/0003648 A1 * | 1/2014 | Fedorovskaya | .... | G06K 9/00677 382/100 |
| 2014/0164061 A1 * | 6/2014 | Sterne | ................ | G06Q 30/0201 705/7.32 |

(Continued)

FOREIGN PATENT DOCUMENTS

WO    201420151    12/2014

OTHER PUBLICATIONS

Reed, "Role of Social Media in Investigating an Outbreak: the Good, the Bad, and the Ugly"—Los Angeles, Feb. 2011.

(Continued)

*Primary Examiner* — Tyler W Knox
(74) *Attorney, Agent, or Firm* — Joseph Polimeni; Edell, Shapiro & Finnan, LLC

(57) ABSTRACT

In acquiring and publishing supplemental information for a network site, information published by a user on a network site including an image of a product and corresponding metadata is analyzed. A provider of the product is identified based on the analysis of the published information and a survey is presented to the user based on the identified provider. Responses to the survey are received from the user and the responses from the user are published on the network site in association with the published information.

17 Claims, 5 Drawing Sheets

(56) References Cited

U.S. PATENT DOCUMENTS

| | | | |
|---|---|---|---|
| 2014/0278786 A1* | 9/2014 | Liu-Qiu-Yan | G06Q 30/0201 705/7.32 |
| 2014/0358664 A1 | 12/2014 | Wheeler | |
| 2015/0012331 A1 | 1/2015 | Carter et al. | |
| 2015/0020096 A1 | 1/2015 | Walker | |
| 2015/0025977 A1 | 1/2015 | Doyle et al. | |
| 2015/0025986 A1 | 1/2015 | Patel et al. | |
| 2015/0032675 A1 | 1/2015 | Huehn et al. | |
| 2015/0055085 A1* | 2/2015 | Fonte | G06F 16/22 351/178 |
| 2015/0149315 A1* | 5/2015 | Tischer | G06Q 30/0601 705/26.1 |
| 2015/0150023 A1* | 5/2015 | Johnson | G06F 9/5027 718/107 |
| 2015/0178754 A1* | 6/2015 | Liu | G06Q 30/0217 705/14.19 |
| 2016/0140627 A1* | 5/2016 | Moreau | G06Q 30/0282 705/7.32 |
| 2016/0171582 A1* | 6/2016 | Linden | G06Q 30/0625 705/26.62 |

OTHER PUBLICATIONS

Osatuyi, "Information sharing on social media sites." Computers in Human Behavior 29.6 (2013): 2622-2631.

Hansen et al. "Do You Know the Way to SNA?: A Process Model for Analyzing and Visualizing Social Media Network Data." Social Informatics (SocialInformatics), 2012 International Conference on. IEEE, 2012.

"Online Social Networking Survey", http://www.surveymonkey.com/s.aspx?sm=Vdk1FdXRjf_2bBQdW..., retrieved from internet Sep. 17, 2014.

Porterfield, "How to Supercharge Your Social Media Presence With Online Surveys", http://www.socialmediaexaminer.com/online-surveys/, Aug. 6, 2010.

"Social Media—Umfragen", https://de.surveymonkey.com/mp/social-media-surveys/, retrieved from internet Sep. 17, 2014.

* cited by examiner

ACQUIRING AND PUBLISHING SUPPLEMENTAL INFORMATION ON A NETWORK

BACKGROUND

1. Technical Field

Present invention embodiments relate to acquiring and publishing supplemental information on a network and, more specifically, to acquiring supplemental information about identified information on a network site, such as a social network site, via a survey and publishing the supplemental information on the network site.

2. Discussion of the Related Art

Since social networking sites allow users to freely express opinions, social network data has great potential marketing value. However, in order to extract this value, user opinions of various products and businesses must be gathered or gleaned in a useful manner. Some approaches taken to leverage social networking sites for marketing purposes parse user information to determine appropriate ads or targeted marketing campaigns. Meanwhile, other approaches interact with users, perhaps offering rewards for certain actions.

However, with the enhancement of mobile devices and, in particular camera enhancements of mobile devices, many users now post photographs with or instead of comments/opinions in order to share experiences, ideas, developments, etc. In fact, photographs of new and interesting products, food items, travel locations and accommodations, etc. are currently being shared or posted on social media or networking sites at an ever increasing rate. Once a first user posts a photograph to a network site, other users may view the posted photograph and provide feedback, comments, etc., and the posting user may respond if desired. However, if a user does not post an opinion with a photograph, either initially or in response to a comment, a user's thoughts about products, places, or any objects shown in the photograph may be unclear and, thus, undesirable for marketing and/or business purposes. Moreover, even if it is clear whether a user liked or disliked the objects shown in the photograph, a business that manufactured, sold, or otherwise has an interest in the object may want to know more information about the user's experience.

SUMMARY

According to one embodiment of the present invention, supplemental information for a network site is acquired and published. Information published by a user on a network site including an image of a product and corresponding metadata is analyzed. A provider of the product is identified based on the analysis of the published information and a survey from the identified provider is presented to the user. Responses to the survey are received from the user and the responses from the user are published on the network site in association with the published information.

BRIEF DESCRIPTION OF THE DRAWINGS

Generally, like reference numerals in the various figures are utilized to designate like components.

DETAILED DESCRIPTION

Figure 1:
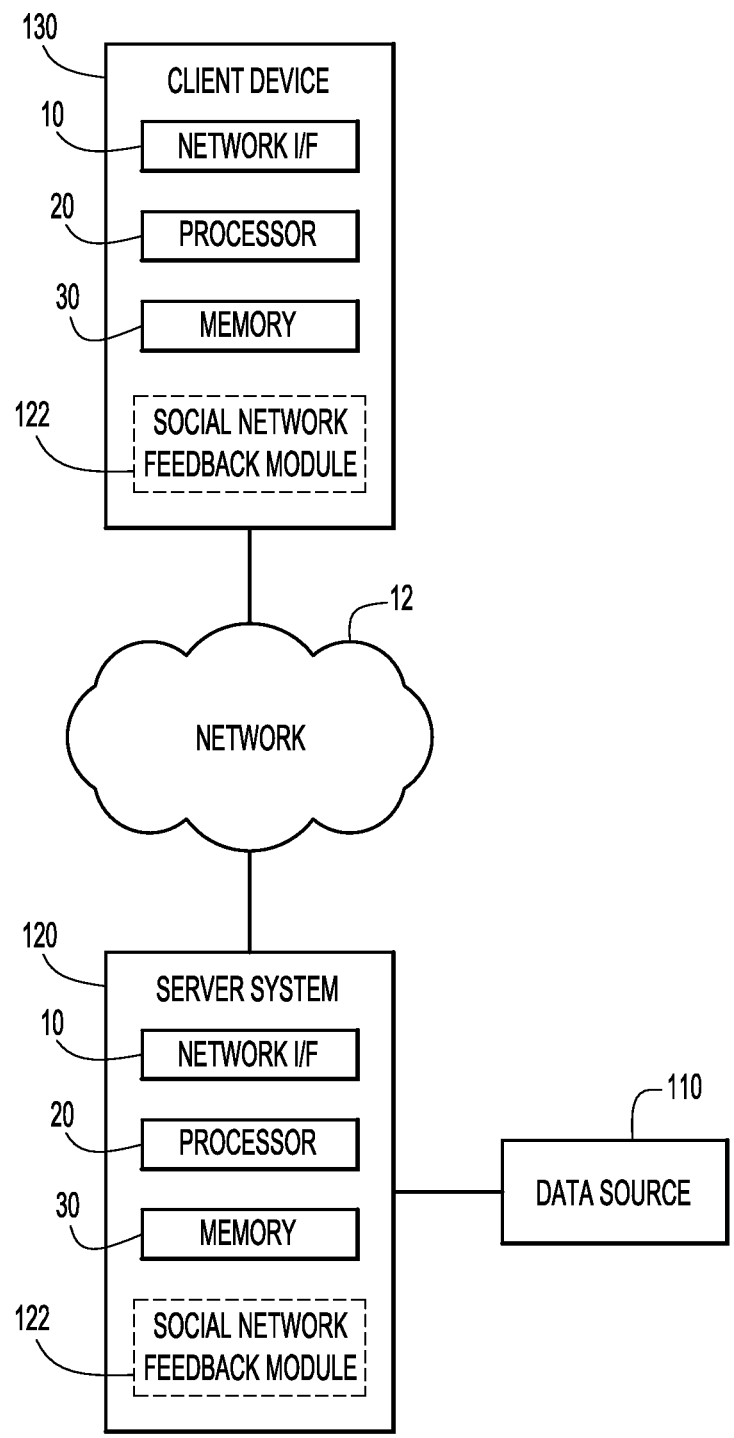
FIG. 1 illustrates an example environment in which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Generally referring to the FIGS. 1-5, present invention embodiments are configured to obtain supplemental information, including feedback, from users that publish (e.g., post) media on social networking sites and share the supplemental information with the published media. For example, once a user publishes one or more photographs on a social networking site, present invention embodiments are configured to perform contextual analysis of the published photographs, as well as any captions, in order to identify target objects in the photographs. Then, an online survey associated with the identified target objects is provided to the user that published the picture. Once the user responds to the survey, the feedback from the user will be published with the photographs. An entity associated with the object can also provide the user with a reward, such as a discount coupon, upon completing the survey.

An example environment for present invention embodiments is illustrated in FIG. 1. Specifically, the environment includes one or more data sources 110, one or more server systems 120, and one or more client or end-user systems 130. Data sources 110, server systems 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of data sources 110, server systems 120, and/or client systems 130 may be local to each other, and communicate via any appropriate local communication medium (e.g., local area network (LAN), hardwire, wireless link, intranet, etc.). A data source 110 may be implemented by any conventional information storage system (e.g., database, file system server, etc.).

A server system 120 may include a social network feedback module 122. The social network feedback module 122 may be implemented across plural server systems. Alternatively, the social network feedback module 122, or at least a portion thereof, may reside on a client system 130 for use with an interface of the client system 130. Client systems 130 enable users to communicate with the server system 120 (e.g., via network 12). The client systems may present any graphical user interface (e.g., GUI, etc.) or other interface (e.g., command line prompts, menu screens, etc.) to receive commands from users and interact with the social network feedback module 122 and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software.

The social network feedback module 122 may include one or more modules or units to perform the various functions of present invention embodiments described below. The social network feedback module 122 may be implemented by any combination of any quantity of software and/or hardware modules or units, and/or may reside within memory 30 of a server system and/or client systems for execution by processor 20.

Figure 2:
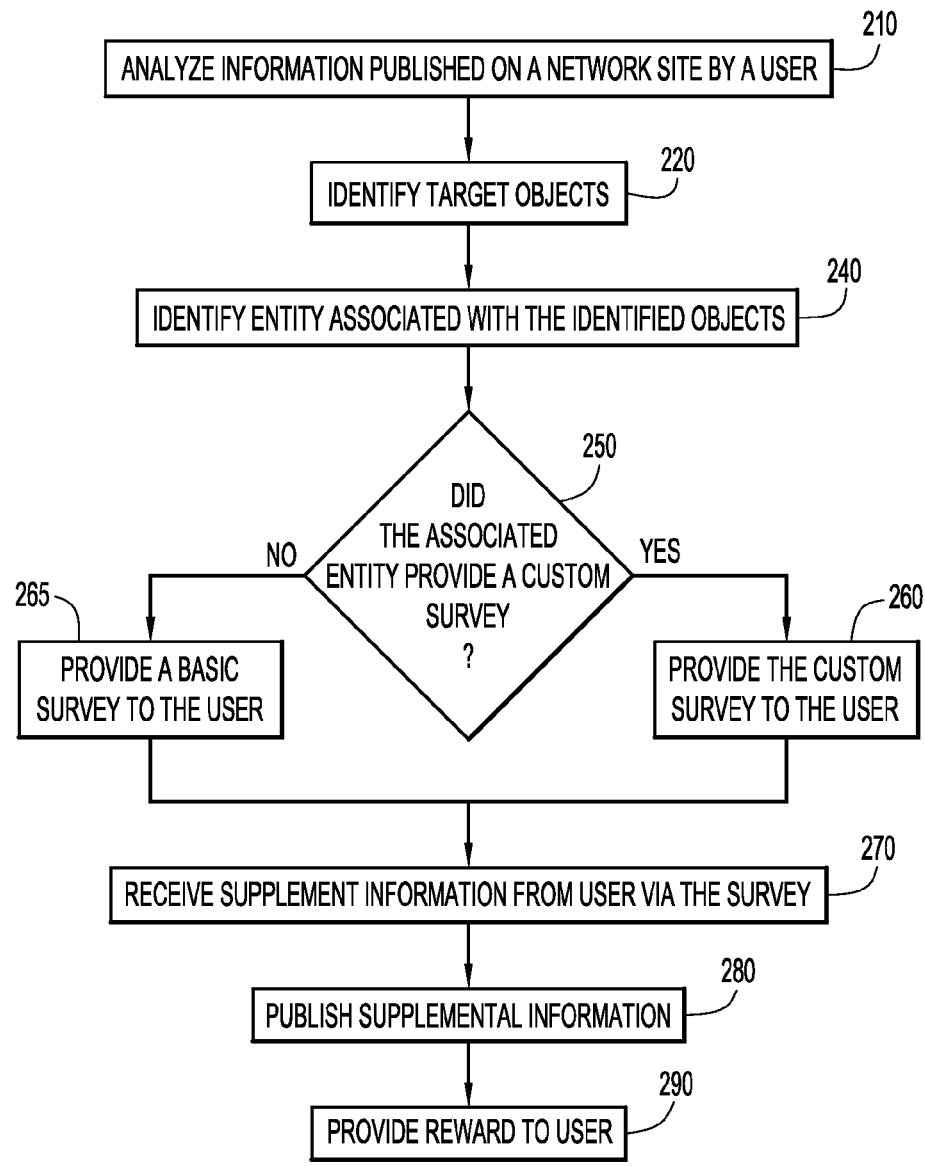
FIG. 2 is a procedural flow chart of an example method of acquiring and publishing supplemental information according to a present invention embodiment.

A manner of acquiring and publishing supplemental information for a network site (e.g. via social network feedback module 122, server system 120 and/or client system 130) according to an embodiment of the present invention is illustrated in FIG. 2. Initially, information published on a network site, such as a social networking site, including photographs, links, text, videos, and locations, may be analyzed at step 210 to determine if the published information has any identifying information or characteristics, including image objects, logos, and/or any other recognizable items. More specifically, when a user uploads information to a social networking server to be published, the server will receive any photographs and/or captions to be published and the information on the social networking server may be analyzed to determine if the published information has any identifying information.

The analysis performed at step 210 may include extracting any metadata, such as geographical identification and time metadata, associated with the information published on a network site in order to determine characteristics of published information. For example, once a photograph is published on a social networking site any logos in the picture may be analyzed to determine a brand and the metadata associated with the published photograph may be analyzed to determine the capture time, capture location, publish time, and/or location of the photograph. Then, together this information may be used to determine the exact location of a store where an item was purchased.

Based on the information analyzed at step 210, target objects in the published information may be identified at step 220 and entities associated with the identified objects may be identified at step 240. For example, if a user posts a picture of a particular dish, the dish may be identified at step 220 and a restaurant that makes and/or sells that dish may be identified at step 240. As another example, if an identified dish or product is made and/or sold by a certain chain of restaurants or stores, the capture location of the published image may be used to identify the location of the franchise where the published photograph was captured. In some embodiments, target objects may be identified via photo matching techniques (e.g., cropping target objects and matching the cropped image with known objects); however, in other embodiments any desirable technique or method may be used to identify target objects.

In preferred embodiments, target objects to be identified include food items, consumer products, and other tangible products, such that a provider that sells that particular product may be considered the associated entity at step 240. However, in some embodiments, locations, landmarks, tourist attractions, and other such items may also be considered target objects to be identified. In these embodiments, a local agency or business may be associated with the target objects if desired. For example, if a local park is identified in a published photograph, the local government's parks department could be the entity associated with the identified object. Similarly, if a user publishes a picture of the Coliseum in Rome, travel or tourist agencies in Rome could be identified as the associated entity or entities.

Once target objects and associated entities have been identified, a determination may be made at step 250 as to whether the associated entity uploaded or otherwise provided a custom survey, insofar as custom simply implies that the survey is provided by the associated entity. In some embodiments, the associated entity may provide different surveys for different locations or different products, but in other embodiments an associated entity may provide surveys for a particular business aspect of concern. For example, in some embodiments, a restaurant may provide a survey asking about the taste of the food and the atmosphere while a sporting goods producer may provide a survey asking about how the identified object has performed. Thus, allowing entities to provide custom surveys may increase the value of the surveys by allowing the associated entities to ask targeted questions.

If at step 250, it is determined that the associated entity provided a custom survey, the custom survey is provided to the user at step 260. However, if a custom survey was not provided by the associated entity, a basic or standard survey may be provided to the user at step 265 in order to obtain supplemental information. Thus, even if an identified target object is associated with an entity that is not participating in the survey process, supplemental information about an identified target object and/or associated entity may be obtained from the user. In still other embodiments, an associated entity may be contacted when they are identified and asked to provide a survey. However, providing basic or custom surveys dependent on whether the associated entity provides a custom survey may be preferred since it may ensure surveys are delivered to users in a timely fashion by eliminating any need to rely on the associated entities to quickly provide surveys. Moreover, providing the user with basic surveys when the associated entity fails to provide a custom survey may allow the surveys to serve as both a marketing tool and a social evaluation.

Regardless of the type of survey provided to the user, the surveys may be provided automatically upon the determination of an associated entity and may include a small number of questions, such as two to three questions for a user to quickly respond. The questions may be related to food item, price, likeliness of recommendation, environment, and/or any other desirable area of feedback and may be provided adjacent to or with the information while a user is preparing information to be published or subsequent to a user publishing information.

When a user completes the survey by providing responses to the questions included therein, the user's responses may provide supplemental information about the identified target object and/or the associated entity that can be received at step 270, in some embodiments, the user responses may be received in the form of text and/or voice responses, but in other embodiments, the user provides responses via a client device, perhaps by selecting a certain button, option, etc. in a graphical user interface. Moreover, in some embodiments, the supplemental information may be a simple rating on a scale, such as a number or star scale and may be received when a user clicks an associated checkbox. However, in other embodiments, supplemental information may be received in any desirable form and may relate to any desirable aspect of the identified target object or identified associated entity.

Once the supplemental information is received at step 270, the social network feedback module 12 may automatically extract the supplemental information so that the supplemental information may be published on a network site at step 280 and a reward may be provided to a user at step 290. More specifically, once the supplemental information is received (i.e., extracted from responses manually input by a user), a graphical plot of the supplemental information may be published on a network site with the information initially published on a network site by the user in order to indicate a review or rating so that other users in the social network can view the publishing user's feedback. For example, if a user posted a photo of a dish from a restaurant and gave the restaurant 3 stars for quality of food and three starts for quality of atmosphere, 3 stars may be published on a network site with the photograph, perhaps adjacent a caption included with the published photograph. The supplemental information is also preferably published in a manner that is easy for the associated entities to propagate the user feedback included in the supplement information, as well as the information included in the initially published information.

After the user has provided the supplemental information, a reward, such as a coupon, an amount of reward points, etc. is provided to the user. In some embodiments, the reward may be immediately presented to the user at step 270, but in other embodiments, the reward may be provided to the user at a later time, perhaps via email. Regardless of the how the reward is provided to the user, the reward is preferably related to the associated entity in order to thank the user for reviewing the associated entity and to encourage another visit or purchase from the associated entity. Moreover, in some embodiments, the reward may be related to the supplemental information received at step 270. For example, users providing better reviews may receive better rewards if desired. However, in other embodiments, the same reward, such as a 20% off coupon, may be provided to every user that provides supplemental information via the survey.

Figure 3:
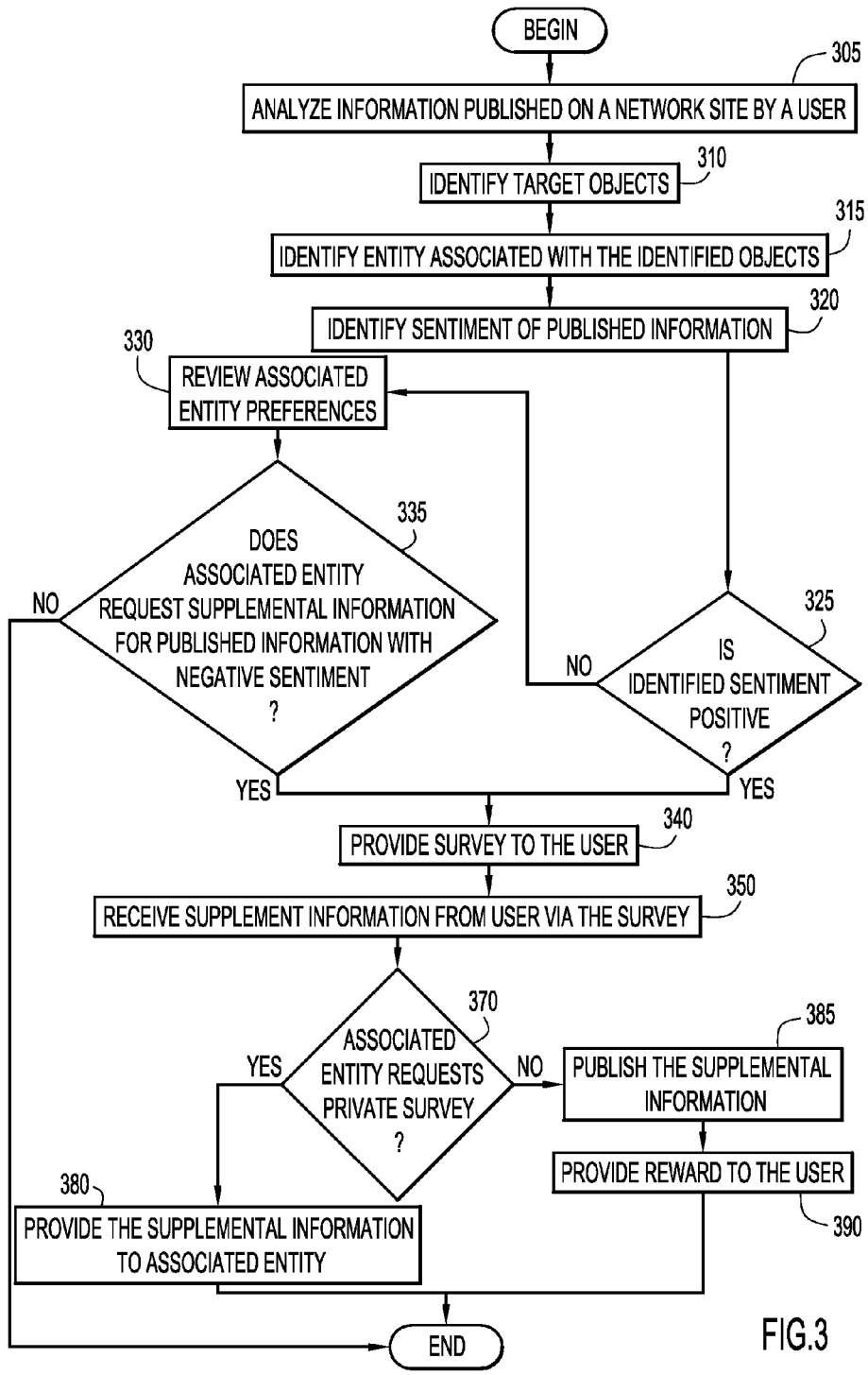
FIG. 3 is a procedural flow chart of another example method of acquiring and publishing supplemental information according to a present invention embodiment.

Now referring to FIG. 3, another example present invention embodiment is illustrated in a procedural flow chart. The example embodiment illustrated in FIG. 3 is substantially similar to the example embodiment illustrated in FIG. 2, except that the embodiment illustrated in FIG. 3 also determines a sentiment associated with published information and allows surveys and/or supplemental information to be withheld, if desired, based on the determined sentiment (e.g. via social network feedback module 122, server system 120 and/or client system 130). In other words, surveys may only be provided to information published on a network site with a certain detected sentiment. More specifically, in the example embodiment shown in FIG. 3, information published on a network site with a negative sentiment may be generally filtered out if desired, such that users who publish information with a negative sentiment are not provided with surveys or only provided with private surveys (e.g., the supplemental information is not published). This embodiment may be preferable to associated entities that prefer not to have negative reviews or information published.

More specifically, similar to the flow chart of FIG. 2, initially information published by a user on a network site is analyzed at step 305. The information may be analyzed in the same manner that information published on a network site is analyzed at step 210 (as described above), however, additionally or alternatively, the analysis performed at step 305 may include sentiment analysis that may determine if the published information is associated with positive feelings/experiences or negative feelings/experiences. For example, if a picture published on a network site is captioned with a smiley face emoticon, sentiment analysis may determine that the published information is associated with a good feeling, satisfied experience, or otherwise positive experience. In contrast, if a photograph published on a network site is accompanied by a caption that indicates negative emotions and/or experiences, etc., such as the word "terrible" or "gross," the sentiment analysis may determine that this published information has a negative sentiment associated with it.

Target objects and entities associated with the target objects may be identified at steps 310 and 315 (in the same manner described above with regards to steps 220 and 240), but, in this embodiment, a sentiment included in the information published on a network site may also be identified at step 320. For example, if the published information says "awesome lunch" and posts a picture collage of a restaurant logo and a specific dish, the specific dish, the restaurant, and the positive sentiment may be identified at steps 310, 315, and 320, respectively. However, in some embodiments, sentiment may only be determined from text or text-like objects included in captions or comments of information published on a network site.

At step 325, a determination as to whether an identified sentiment is positive may be made. The determination may be made in accordance with conventional techniques, such as textual analysis. If the sentiment is negative, the preferences of an associated entity identified at step 315 may be reviewed at step 330 and a determination as to whether the identified associated entity would still like a survey to be provided to the user may be made at step 335. By comparison, if an identified sentiment is positive, a survey may simply be provided to the user at step 340. However, since sentiment analysis may only be able to analyze comments or captions included with published media, the sentiment of published information may not always be able to be determined. In some embodiments, an undetermined sentiment may be assumed to be positive in order to gather as much feedback as possible, but in other embodiments, an undetermined sentiment may be assumed to be negative in order to limit negative exposure. In preferred embodiments, undetermined sentiments are assumed to be negative such that a survey is only provided to users publishing information with a positive sentiment or associated with an entity that explicitly requests supplement information for any type of sentiment.

If, at step 335, it is determined that the associated entity requested surveys to be sent to users publishing information on a network site with negative sentiments, a survey may be provided to the user at step 340. However, a survey is only provided to a user positing negative sentiments if it is explicitly requested by the associated entity. Thus, if an associated entity does not provide any preferences, a survey will not be provided to a user publishing information associated with that entity that includes a negative sentiment. In other words, at step 335, it may be assumed that the associated entity did not request a survey to be provided to a user unless explicit preferences to the contrary are reviewed at step 330. This may limit the amount of negative reviews and negative exposure given to associated entities.

If a survey is provided to a user at step 340, either because the user published information on a network site with a positive sentiment or because the user published information with a negative sentiment on a network site about identified objects from an identified associated entity that is requesting supplemental information from users publishing information with negative sentiments, the survey may be provided in a similar manner to the manner discussed above with respect to steps 250, 260, and 265. In other words, regardless of whether an identified sentiment is negative or positive, the survey provided to the user at step 340 may be a basic survey or custom survey, as described with regards to FIG. 2 above.

Moreover, if a user provides supplemental information via the survey, the supplemental information may be received at step 350 in the same manner as described above with respect to step 270. Alternatively, if an associated entity does not request supplemental information from users publishing information on a network site with negative sentiments, either passively (e.g., by not submitting preferences) or actively (e.g., by specifying that surveys are not to be provided to users posting negative sentiments with items associated with that entity), a survey may not be provided to the publishing user and no supplemental information may be acquired from the publishing user.

Still referring to FIG. 3, in some instances, entities requesting supplemental information from a user posting information with negative sentiments may only want to acquire the information for internal purposes. Consequently, at step 370, a determination may be made as to whether the associated entity requested a private survey. If a private survey was requested, the supplemental information may be provided to the associated entity at step 380 without being published on a network site. However, if the associated entity did not request a private survey, the information may be published on a network site at step 385 and a reward may be provided to the user at step 390 in the same manner as is described above with regards to steps 280 and 290 of FIG. 2. Notably, in preferred embodiments, any supplemental information received from users publishing information on a network site with an identified positive sentiment is published on the network site. In fact, in some embodiments, associated entities may not be provided with an option to provide private surveys to users posting information with positive sentiments. Instead, the private survey option may only be an option for entities that request that surveys be provided to users publishing information with negative sentiment. For example, a preference for a private survey may be included in an associated entity's preferences and reviewed at step 330.

Regardless of whether supplemental information is published on a network site, the supplemental information received at step 350 may always be received and stored in a manner that may be accessible by the associated entity. Consequently, an associated entity may be able to review any supplemental information for marketing or other business purposes. In some embodiments, access to the supplemental information may be controlled and only distributed to associated entities on a case by case basis (e.g., if an associated entity pays for the supplemental information), but in other embodiments, the supplemental information may be immediately supplied or otherwise associated with its associated entity. For example, any ratings, graphics, and/or graphical plots determined, generated, or published, respectively, by the supplemental information could appear on the associated entity's social networking site as well as with the information initially published by the publishing user.

Figure 4:
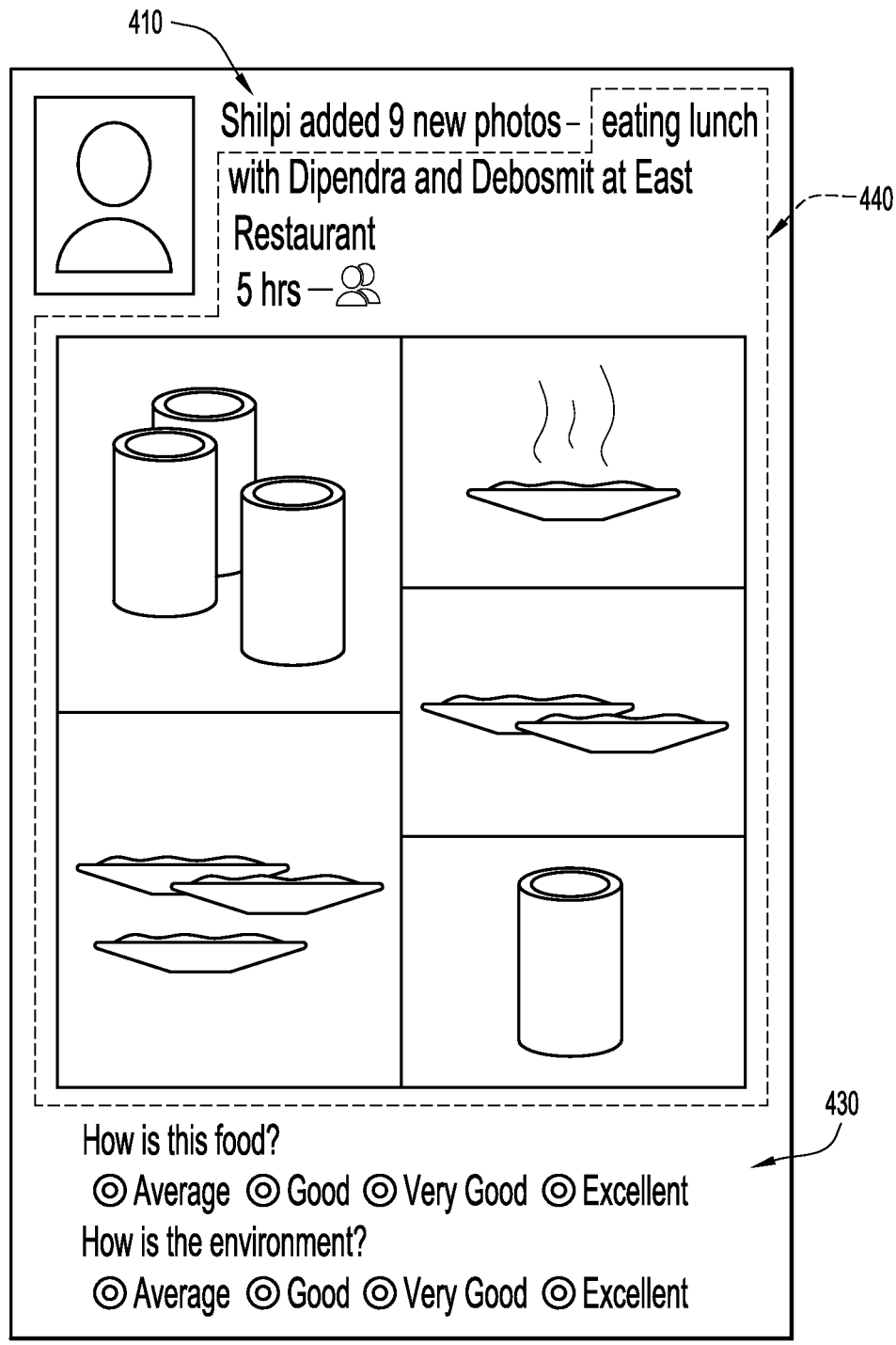
FIG. 4 is a screen shot of an example network site from which supplemental information can be acquired and published, the screen shot showing a post with objects that may be identified in order to determine the supplemental information to acquire and publish.
Figure 5:
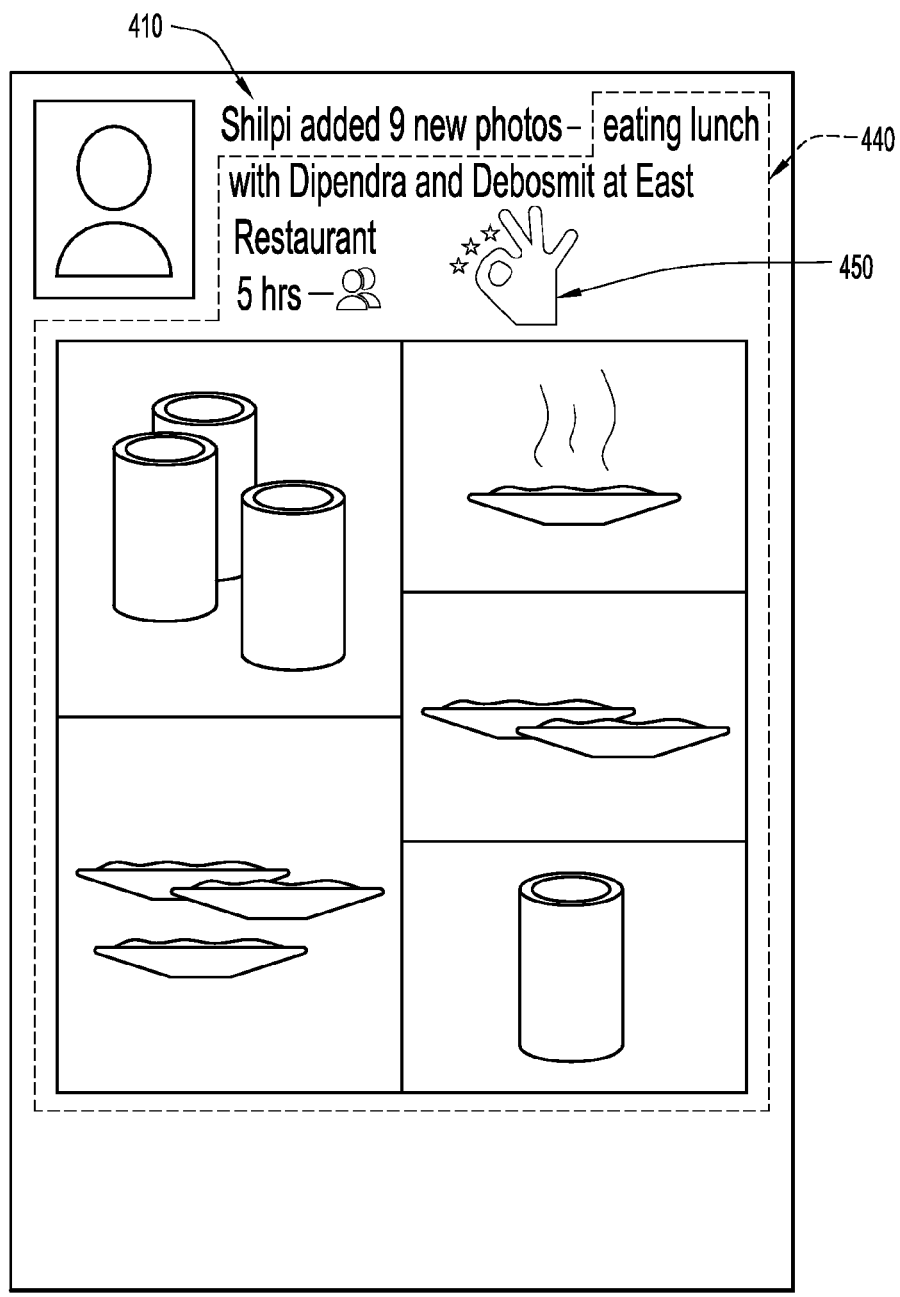
FIG. 5 is a screen shot of the network site of FIG. 3 showing supplemental information published on the network site.

Now turning to FIGS. 4-5, screen shots of an exemplary network site are shown providing a survey to a publishing user and displaying the published supplemental information, respectively. First in FIG. 4, a screen shot of published information 440, published by a user 410 on a network site, is shown. As can be seen, the published information includes a collection of images of food, a time stamp of "5 hrs," and a caption that provides "[lunch bag symbol] eating lunch with . . . at East Restaurant." Accordingly, an analysis of the published information 440 may reveal that the published images are pictures of dishes from the East Restaurant that user 410 and a number of friends ate for lunch, in this embodiment, the sentiment analysis may assume that a post without negative comments meant the user 410 enjoyed his meal and wanted to share it with friends. Accordingly, a survey 430 may be provided to the user 410 in order to determine: (1) how the user 410 thought the food was at the East Restaurant; and (2) how the user 410 thought the environment was at the East Restaurant. Additionally, the survey 430 provides valuation options under each question that allow the user to quickly respond to each question when providing supplemental information.

In the embodiment shown in FIG. 4, the survey 430 is a basic survey asking generalized questions, but in other embodiments, the survey 430 may ask about specific dishes if they are identified. Moreover, in this embodiment, the survey 430 is only provided to the publishing user 410. In other embodiments, the survey 430 may also be provided to other users, such as users tagged in the published information 440 or users that comment on the published information 440. However, in preferred embodiments, the survey 430 is not provided to users who merely comment on the published information 440, since these users may not have first hand knowledge of the objects included in the published information 440. By comparison, users tagged in the published information 440 may have shared in the experience and, thus, may also have the requisite knowledge to respond to the questions included in the survey 430. Consequently, tagged users may be provided with the survey 430.

FIG. 5 provides a screen shot of the published information 440 from FIG. 4 after the survey 430 has been completed. In this instance, the publishing user 410 selected "Excellent" as a response to both questions shown in the survey 430 shown in FIG. 4. Consequently, in FIG. 5, the supplemental information 450 published with the published information 440 is a picture of three stars and a hand making a hand gesture that is commonly understood to represent something good. If instead, the user 410 had responded to each question with "very good" only two stars may have been included in the supplemental information 450. Similarly, if the user 410 responded with "Good" or "Average" then the hand symbol may be changed to a less positive gesture and may have been published with one or no stars. Moreover, if the user gave different responses to the questions, the symbol and number of stars included in the supplemental information 450 may be based on an average of the various ratings or responses.

However, it is to be understood that the hand symbol and stars shown as the published supplemental information 450 are only examples of supplemental information and, in other embodiments, any desirable graphical plot may be used to represent the supplemental information received from the survey 430. For example, in other embodiments, the published supplemental information can be animated graphics, image icons, text based, audio based, or any other desirable form. That being said, in preferred embodiments, the supplemental information 450 is published on a network site as a graphical plot with a scale of some sort to represent the valuation received from the survey 430. Moreover, in preferred embodiments, the published supplemental information 450 is highlighted or otherwise distinguished in order to help users viewing the published information quickly find the supplemental information 450.

In some embodiments, when multiple users have provided supplemental information about the same associated entity (e.g., when a publishing user and the friends that the publishing user had lunch with all provide responses to a survey and/or when multiple publishing users provide supplemental information about the same associated entity), the supplemental information may be aggregated to form a composite rating. In these embodiments, the published supplemental information (e.g., the graphical plot) may be representative of the composite rating and may change over time as additional supplemental information is acquired for the associated entity and/or identified objects in the published information and the rating changes.

For example, if a first user posts a photograph of a dish from a restaurant and rates the food as excellent, a graphical plot may be published with the photograph of the dish that represents an excellent rating. Then, if a second user publishes a photograph of the same dish from the same restaurant with a poor rating, the graphical plot published with the first user's photograph may be updated to reflect a rating that is an average of the two ratings. The composite graphical plot that represents an average of the two ratings may also be published with the photograph published by the second user. In some of these embodiments, the composite rating may only be associated with the associated entity (e.g., the restaurant) while a rating that a user provided for an identified object (e.g., a specific dish) remains constant, but in other embodiments, a composite rating may be included or represented in supplemental information for any desired published information.

Still referring to FIGS. 4-5, in these embodiments, the survey 430 is provided at a cover page for an entire album of photos. In other embodiments, the survey may be provided with an individual photographs if desired. In fact, in some embodiments, the questions included in the survey 430 may vary depending on where the survey 430 is provided. For example, if the survey 430 is provided on an album cover for a collection of pictures from a single restaurant, the survey 430 may relate generally to the restaurant while if the survey 430 is provided with a single image, the survey 430 may relate to the specific dish or item shown in that photograph. Similarly, supplemental information 450 received from the survey 430 may be published with an individual photograph or with an album, as desired.

It will be appreciated that the embodiments described above and illustrated in the drawings represent only a few of the many ways of implementing embodiments of acquiring and publishing supplemental information.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., target object identities). The database system may be implemented by any number of any conventional or other databases, data stores or storage structures (e.g., files, databases, data structures, data or other repositories, etc.) to store information (e.g., target object identities). The database system may be included within or coupled to the server and/or client systems. The database systems and/or storage structures may be remote from or local to the computer or other processing systems, and may store any desired data (e.g., target object identities).

The present invention embodiments may employ any number of any type of user interface (e.g., Graphical User Interface (GUI), command-line, prompt, etc.) for obtaining or providing information (e.g., custom and/or basic surveys), where the interface may include any information arranged in any fashion. The interface may include any number of any types of input or actuation mechanisms (e.g., buttons, icons, fields, boxes, links, etc.) disposed at any locations to enter/ display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", an and "the" are intended to include the plural forms as well, unless the context clearly indicates otherwise. It will be flintier understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including, an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of acquiring and publishing supplemental information for a network site comprising:
   capturing an image pertaining to a product by a mobile device and uploading the image from the mobile device to a processor hosting network sites, wherein the image includes a photograph of the product;
   monitoring network sites by detecting the processor hosting the network sites uploading images;
   identifying the network site for publishing the image pertaining to the product based on the detected uploading by the processor hosting the network sites;
   analyzing, via a processor, information pertaining to the product to be published by a user on the network site including the image of the product, textual information, and corresponding metadata;
   identifying, via a processor, the provider of the product and a type of survey, wherein identifying the provider further comprises:
      performing image processing on the image to identify a plurality of target objects within the image;
      cropping the image and generating from the image a plurality of cropped images each corresponding to an identified target object, wherein each cropped image includes a portion of the image containing the corresponding target object, and wherein the plurality of target objects includes the product and an identifier of the provider;
      comparing the cropped images for the target objects to images of known objects to obtain the product and the identifier of the provider; and
      determining the provider based on the identifier of the provider;
   analyzing, via a processor, the information to be published including a combination of the image and the textual information to determine a type of sentiment of the user toward the product, wherein the type of sentiment includes a positive sentiment, a negative sentiment, and an unknown sentiment;
   in response to the positive sentiment of the user toward the product and during publication on the network site:
      presenting, via a processor, a survey to the user on a user interface based on the identified provider, wherein the survey includes a plurality of questions each pertaining to a corresponding attribute of the product and graphical objects of the user interface to receive responses to the questions;
      receiving, via a processor, the responses to the plurality of questions of the survey entered by the user on the user interface; and
      publishing, via a processor, the image and the responses from the user on the network site in association with the textual information;
   in response to the negative sentiment of the user toward the product and during publication on the network site:
      presenting, via a processor, a private survey to the user on the user interface based on the identified provider, wherein the private survey includes a plurality of questions each pertaining to a corresponding attribute of the product and graphical objects of the user interface to receive responses to the questions;
      receiving, via a processor, the responses to the plurality of questions of the private survey entered by the user on the user interface;
      publishing, via a processor, the image on the network site in association with the textual information; and
      sending, via a processor, the responses from the user to the private survey to the identified provider without publication on the network site; and
   in response to the unknown sentiment of the user toward the product and during publication on the network site:
      presenting, via a processor, the private survey to the user on the user interface based on the identified provider, wherein the private survey includes the plurality of questions each pertaining to the corresponding attribute of the product and graphical objects of the user interface to receive responses to the questions;
      receiving, via a processor, the responses to the plurality of questions of the private survey entered by the user on the user interface;
      publishing, via a processor, the image on the network site in association with the textual information; and
      sending, via a processor, the responses from the user to the private survey to the identified provider without publication on the network site.

2. The method of claim 1, further comprising:
   transferring a reward to the user in response to receiving the responses from the user to the survey.

3. The method of claim 1, wherein publishing the responses comprises:
generating a graphical plot of the responses and publishing the graphical plot on the network site.

4. The method of claim 1, wherein the responses to the survey and private survey are in the form of one of text and voice.

5. The method of claim 1, wherein the network site includes a social networking site.

6. The method claim 1, wherein the survey is a custom survey provided by the provider.

7. A system for acquiring and publishing supplemental information for a network site comprising:
a processor configured to:
monitor network sites by detecting a processor hosting the network sites uploading images, wherein the images include an image pertaining to a product captured by a mobile device, and wherein the image pertaining to the product comprises a photograph of the product;
identify the network site for publishing the image pertaining to the product based on the detected uploading by the processor hosting the network sites;
analyze information pertaining to the product to be published by a user on the network site including the image of the product, textual information, and corresponding metadata;
identify the provider of the product and a type of survey, wherein identifying the provider further comprises:
performing image processing on the image to identify a plurality of target objects within the image;
cropping the image and generating from the image a plurality of cropped images each corresponding to an identified target object, wherein each cropped image includes a portion of the image containing the corresponding target object, and wherein the plurality of target objects includes the product and an identifier of the provider;
comparing the cropped images for the target objects to images of known objects to obtain the product and the identifier of the provider; and
determining the provider based on the identifier of the provider;
analyze the information to be published including a combination of the image and the textual information to determine a type of sentiment of the user toward the product, wherein the type of sentiment includes a positive sentiment, a negative sentiment, and an unknown sentiment;
in response to the positive sentiment of the user toward the product and during publication on the network site:
present a survey to the user on a user interface based on the identified provider, wherein the survey includes a plurality of questions each pertaining to a corresponding attribute of the product and graphical objects of the user interface to receive responses to the questions;
receive the responses to the plurality of questions of the survey entered by the user on the user interface; and
publish the image and the responses from the user on the network site in association with the textual information;
in response to the negative sentiment of the user toward the product and during publication on the network site:
present a private survey to the user on the user interface based on the identified provider, wherein the private survey includes a plurality of questions each pertaining to a corresponding attribute of the product and graphical objects of the user interface to receive responses to the questions;
receive the responses to the plurality of questions of the private survey entered by the user on the user interface;
publish the image on the network site in association with the textual information; and
send the responses from the user to the private survey to the identified provider without publication on the network site; and
in response to the unknown sentiment of the user toward the product and during publication on the network site:
present the private survey to the user on the user interface based on the identified provider, wherein the private survey includes the plurality of questions each pertaining to the corresponding attribute of the product and graphical objects of the user interface to receive responses to the questions;
receive the responses to the plurality of questions of the private survey entered by the user on the user interface;
publish the image on the network site in association with the textual information; and
send the responses from the user to the private survey to the identified provider without publication on the network site.

8. The system of claim 7, wherein the processor is further configured to:
transfer a reward to the user in response to receiving the responses from the user to the survey.

9. The system of claim 7, wherein, in publishing the responses, the processor is further configured to:
generate a graphical plot of the responses and publish the graphical plot on the network site.

10. The system of claim 7, wherein the responses to the survey and private survey are in the form of one of text and voice.

11. The system of claim 7, wherein the network site includes a social networking site.

12. The system of claim 7, wherein the survey is a custom survey provided by the provider.

13. A computer program product for acquiring and publishing supplemental information for a network site, comprising a computer-readable storage medium having computer-readable program code embodied thereon, the computer-readable program code, when executed by a processor, causes the processor to:
monitor network sites by detecting a processor hosting the network sites uploading images, wherein the images include an image pertaining to a product captured by a mobile device, and wherein the image pertaining to the product comprises a photograph of the product;
identify the network site for publishing the image pertaining to the product based on the detected uploading by the processor hosting the network sites;

analyze information pertaining to the product to be published by a user on the network site including the image of the product, textual information, and corresponding metadata;

identify the provider of the product and a type of survey, wherein identifying the provider further comprises:

performing image processing on the image to identify a plurality of target objects within the image;

cropping the image and generating from the image a plurality of cropped images each corresponding to an identified target object, wherein each cropped image includes a portion of the image containing the corresponding target object, and wherein the plurality of target objects includes the product and an identifier of the provider;

comparing the cropped images for the target objects to images of known objects to obtain the product and the identifier of the provider; and determining the provider based on the identifier of the provider;

analyze the information to be published including a combination of the image and the textual information to determine a type of sentiment of the user toward the product, wherein the type of sentiment includes a positive sentiment, a negative sentiment, and an unknown sentiment;

in response to the positive sentiment of the user toward the product and during publication on the network site:

present a survey to the user on a user interface based on the identified provider, wherein the survey includes a plurality of questions each pertaining to a corresponding attribute of the product and graphical objects of the user interface to receive responses to the questions;

receive the responses to the plurality of questions of the survey entered by the user on the user interface; and publish the image and the responses from the user on the network site in association with the textual information;

in response to the negative sentiment of the user toward the product and during publication on the network site:

present a private survey to the user on the user interface based on the identified provider, wherein the private survey includes a plurality of questions each pertaining to a corresponding attribute of the product and graphical objects of the user interface to receive responses to the questions;

receive the responses to the plurality of questions of the private survey entered by the user on the user interface;

publish the image on the network site in association with the textual information; and send the responses from the user to the private survey to the identified provider without publication on the network site; and in response to the unknown sentiment of the user toward the product and during publication on the network site:

present the private survey to the user on the user interface based on the identified provider, wherein the private survey includes the plurality of questions each pertaining to the corresponding attribute of the product and graphical objects of the user interface to receive responses to the questions;

receive the responses to the plurality of questions of the private survey entered by the user on the user interface;

publish the image on the network site in association with the textual information; and send the responses from the user to the private survey to the identified provider without publication on the network site.

14. The computer program product of claim 13, wherein the computer-readable program code is further configured to cause the processor to:

transfer a reward to the user in response to receiving the responses from the user to the survey.

15. The computer program product of claim 13, wherein the computer-readable program code that causes the processor to publish the responses is further configured to cause the processor to:

generate a graphical plot of the responses and publish the graphical plot on the network site.

16. The computer program product of claim 13, wherein the responses to the survey and private survey are in the form of one of text and voice.

17. The computer program product of claim 13, wherein the network site includes a social networking site.

* * * * *